United States Patent
Iwasaki

(10) Patent No.: US 7,368,951 B2
(45) Date of Patent: May 6, 2008

(54) DATA TRANSMISSION CIRCUIT AND DATA TRANSMISSION METHOD WITH TWO TRANSMISSION MODES

(75) Inventor: Tadashi Iwasaki, Kanagawa (JP)

(73) Assignee: NEC Electronics Corporation (JP)

( * ) Notice: Subject to any disclaimer, the term of this patent is extended or adjusted under 35 U.S.C. 154(b) by 1108 days.

(21) Appl. No.: 10/622,498

(22) Filed: Jul. 21, 2003

(65) Prior Publication Data
US 2004/0151196 A1 Aug. 5, 2004

(30) Foreign Application Priority Data
Jul. 22, 2002 (JP) ............................. 2002-212042

(51) Int. Cl.
*H03K 19/094* (2006.01)
*H03K 19/0175* (2006.01)

(52) U.S. Cl. .......................................... 326/86; 326/30

(58) Field of Classification Search ................ 326/30, 326/86; 327/108
See application file for complete search history.

(56) References Cited

U.S. PATENT DOCUMENTS 6,075,384 A   6/2000 Sim et al.
6,275,066 B1  8/2001 Park et al.
6,525,570 B2 * 2/2003 Yagishita et al. ............. 326/86
6,876,225 B2 * 4/2005 Yagishita et al. ............. 326/30

OTHER PUBLICATIONS

Korean Office Actions issued Jan. 27, 2005 (w/ English translation of relevant portions).
"A 660 MB/s Interface Megacell Portable Circuit in 0.3 μm-0.7 μm CMOS ASIC", IEEE Journal of Solid-State Circuits, vol. 31, No. 12, Dec. 1996.
"Design Guide For A Low Speed Buffer For The Universal Serial Bus", Revision 1.1 Dec. 1996 Intel Corporation.

* cited by examiner

Primary Examiner—James Cho
Assistant Examiner—Crystal L Hammond
(74) Attorney, Agent, or Firm—Dickstein, Shapiro, LLP.

(57) ABSTRACT

In a data transmission circuit according to the present invention, selection circuits alternately switch between transistors of a main buffer and transistors of a dummy buffer. In high-speed data transmission, a H/L transmission switch circuit outputs high-speed data to a constant current driver and outputs a selection signal for inputting a control signal to the main buffer to a selection circuit. In low-speed data transmission, on the other hand, the H/L transmission switch circuit outputs a selection signal for inputting a control signal to the main buffer in accordance with the low-speed data to the selection circuit. The H/L transmission switch circuit controls an input of the control signal to the main buffer in accordance with the selection signal.

20 Claims, 4 Drawing Sheets

DATA TRANSMISSION CIRCUIT AND DATA TRANSMISSION METHOD WITH TWO TRANSMISSION MODES

BACKGROUND OF THE INVENTION

1. Field of the Invention

The present invention relates to a data transmission circuit and a data transmission method. More specifically, the present invention relates to a data transmission circuit and a data transmission method in which data is input and output in a plurality of transmission modes.

2. Related Background Art

Conventionally, a computer and a peripheral device have been connected using an interface for peripheral devices such as a serial interface and a parallel interface. Recently, a universal serial bus (USB), IEEE1394 and other serial interfaces to connect a variety of peripheral devices have come into wide use to integrate and standardize interfaces.

Out of the need of the recent information society for high-speed communication of large volumes of data, USB 2.0 standard offering a faster data transfer rate than the conventional USB 1.x standard such as USB 1.0 standard (the standard of USB Implements Forum or USB-IF) has been developed. The USB 1.x standard has two connection modes: a full-speed mode transferring data at speeds up to 12 Mbps and a low-speed mode up to 1.5 Mbps. In addition to those two modes, the USB 2.0 standard further has a high speed mode supporting data rates of up to 480 Mbps, allowing high-speed communication of larger volumes of data.

In high-speed data transmission such as the USB standard, the waveform could be distorted due to the transmission line reflection effect. Therefore, highly accurate control of output impedance is required for an output buffer to keep the output impedance the same as the transmission line impedance.

For output impedance control, "A 660 MB/s Interface Megacell Portable Circuit in 0.3 µm-0.7 µm CMOS ASIC", IEEE JOURNAL OF SOLID-STATE CIRCUITS, VOL. 31, NO. 12, DECEMBER 1996, for example, describes a method of switching the transistor size to control an output buffer drive capacitance. According to the method, control of the output buffer drive capacitance adjusts output impedance with respect to fluctuations of production, power supply voltage, and temperature to optimize the output impedance.

Further, in high-speed data transmission, it is also important to control a slew rate by an output buffer to prevent the rapid voltage change from generating noise to other units. Therefore, the waveform is controlled to change with slow rising and falling edges.

A proposed method for controlling a slew rate using an output buffer, for example, is to provide a feedback capacitor between an output terminal of the output buffer and a signal line driving final stage transistors, which is described in "DESIGN GUIDE FOR A LOW SPEED BUFFER FOR THE UNIVERSAL SERIAL BUS", Revision1.1 December, 1996 Intel Corporation. According to the method, the feedback capacitor optimizes the rising and falling of a waveform while preventing a rapid change of output signals for suitable data transmission.

The above conventional methods applied to an output buffer of a CMOS push/pull constant voltage driver will be explained hereinbelow with reference to FIGS. 3 and 4 as a conventional output buffer circuit.

As shown in FIG. 3, a conventional output buffer has a main buffer 101 outputting a high logic level (which will be abbreviated hereinafter as a H-main buffer 101), a main buffer 102 outputting a low logic level (as a L-main buffer 102), impedance control terminals 103a, 103b, 103c, and 103d selecting drive transistors, a low level transmission circuit 104 (as a L-transmission circuit 104), and a high level transmission circuit 105 (as a H-transmission circuit 105). The output buffer further has a prebuffer 106 driving the main buffers, a feedback capacitor 108 connected between an output PAD 107 and the prebuffer 106, and a data input terminal 109.

The L-main buffer 102 includes a plurality of Nch transistors 111a, 111b, 111c, and 111d connected between the output PAD 107 and a ground line 110.

The size of each of the Nch transistors 111a to 111d is determined considering a control range, control width and the like to attain optimal output impedance by the combination of control signals input to the impedance control terminals 103a to 103d. For example, different impedance value is assigned to each of the Nch transistors 111a to 111d by weighing for optimal output impedance.

The L-transmission circuit 104 has transistor selection circuits 121, each of which connected to each of the impedance control terminals as well as with each of the Nch transistors of the L-main buffer 102. In this configuration, when an impedance control signal is input to the impedance control terminal 103a, for example, a gate electrode of the Nch transistor 111a of the L-main buffer 102 is clamped to the ground line 110.

A transmission gate 112a of the L-transmission circuit 104 is controlled by an impedance control signal input to the impedance control terminal 103a. Via the transmission gate 112a, the prebuffer 106 is connected to the Nch transistor 111a of the L-main buffer 102.

A clamp Nch transistor 114a is controlled by the impedance control signal from an inverter 113a. The inverter 113a inverts and outputs the control signal. By the Nch transistor 114a, the gate electrode of the Nch transistor 111a of the L-main buffer 102 is clamped to the ground line 110.

The H-main buffer 101 has substantially the same configuration as the L-main buffer, in which the Nch transistor 111a to 111d are replaced with a plurality of Pch transistors (not shown) connected between the output PAD 107 and a power line 115.

The H-transmission circuit 105 has substantially the same configuration as the L-transmission circuit 104, having transistor selecting circuits, each of which connected to each of the impedance control terminals as well as with each of the Pch transistors of the H-main buffer 101. When an impedance control signal is input to the impedance control terminal, a gate electrode of the Pch transistor of the H-main buffer 101 is clamped to the power line 115.

The prebuffer 106 is an inverter. The prebuffer 106 inverts a data signal input through the data input terminal 109, and then outputs the inverted signal to the transmission gate of the L-transmission circuit 104 or H-transmission circuit 105. The feedback capacitor 108 is provided between the prebuffer 106 and the output PAD 107 to prevent a sharp edge of an output signal from the output PAD 107.

Operations of the conventional output buffer having the above configuration will be explained hereinbelow with reference to FIGS. 3 and 4. In data transmission, a control code optimized to obtain a desired value of data output impedance is input as impedance control signals to the impedance control terminals 103a to 103d. The impedance control signal, being a logic high or low, is input to the impedance control terminal as a digital high or low voltage.

If an impedance control signal input to the impedance control terminal 103a is a high logic level, the L-transmission circuit 104 opens the transmission gate 112a. An output voltage of the prebuffer 106 is thereby released to send a data signal inverted by the prebuffer 106 to the Nch transistor 111a of the L-main buffer 102, selecting the transistor 111a as a drive transistor.

If the impedance control signal input to the impedance control terminal 103a is a low logic level, on the other hand, the L-transmission circuit 104 closes the transmission gate 112a. The output voltage of the prebuffer 106 is thereby blocked. At the same time, the clamp Nch transistor 114a of the L-transmission circuit 104 is turned on to fix the gate electrode of the Nch transistor 111a of the L-main buffer 102 to a ground potential. The Nch transistor 111a is thereby turned off not to be selected as a drive transistor.

The H-transmission circuit 105 operates in the same manner as the L-transmission circuit 104. If an impedance control signal input to the impedance control terminal 103a is a logic low, the H-transmission circuit 105 selects the Pch transistor of the H-main buffer 101 as a drive transistor. If the impedance control signal is a logic high, on the other hand, the H-transmission circuit 105 does not select the Pch transistor.

As described above, if a signal input to the data input terminal 109 is a logic low, the inverter 106 outputs a high level to output a ground level to the output PAD 107. If a signal input to the data input terminal 109 is a logic high, on the other hand, the inverter 106 outputs a low level to output a power supply voltage to the output PAD 107. With control of the level of the output PAD 107 in accordance with the level of the data input terminal 109, output impedance is adjusted for optimization with respect to fluctuations of production, power supply voltage, and temperature.

Further, when the output PAD 107 outputs data, the feedback capacitor 108 provided between the output PAD 107 and the prebuffer 106 controls the slew rate of an output waveform to optimize the rising and falling of the waveform.

However, the above output buffer has the followings problems. The output buffer controls output impedance by selecting the transistor (Pch transistor or Nch transistor) of the H-main buffer 101 or the L-main buffer 102 and changing the total size of the transistors. Switching of the drive transistors results in a change in the total size of the drive transistors and a change in the capacitance of the gate electrodes of the transistors.

Also, in the above output buffer, the slew rate of the output waveform is controlled by the load capacitance of the prebuffer 106, which is, the pre-optimized capacitance of the feedback capacitor 108 plus the capacitance of the gate electrodes of selected transistors of the H-main buffer 101 or L-main buffer 102.

Therefore, despite that the slew rate of an output waveform is to be optimized by the feedback capacitor 108, once the load capacitance of the prebuffer 106 is changed for output impedance control, it disables optimization of the slew rate of the output waveform.

On the other hand, optimizing the slew rate of the output waveform disables output impedance control. It is therefore impossible to control both output impedance and a slew rate.

For example, if a drive current to the transistors increases due to a temporal variation in operating temperature or a change in physical property of the transistor, the output impedance of the output buffer decreases. In this case, it is possible to change the impedance control code controlling the output impedance from CODE-A to CODE-B as shown in FIG. 4, for example, to compensate the decrease of the output impedance. The decrease of the output impedance is compensated by reducing a number of drive transistors of the H-main buffer 101 or L-main buffer 102. However, reduction of a number of transistors reduces the load capacitance of the prebuffer 106. The feedback capacitance thereby becomes insufficient, resulting in a sharp edge of an output waveform from the output PAD 107 after changing the impedance control codes.

Further, in output impedance control for production fluctuations of a semiconductor, a property variation of the transistor and that of the capacitor with respect to the production fluctuations do not always correspond to each other. Therefore, adjustment of a control code to fix output impedance with respect to production fluctuations causes the load capacitance of the prebuffer output to differ from a control code to a control code. There is thus a problem that the slew rate of an output waveform differs between control codes.

A method for solving the problem of changing slew rates resulted from impedance control is to employ a capacitor array composed of a plurality of unit capacitors. However, if an output slew rate is controlled by the capacitor array as with the case with output impedance control, a capacitance appears differently between the feedback capacitor and the gate electrode of a drive transistor due to bias voltage dependency, which makes control not easy.

Another method for solving the above problem is described in Japanese Patent Application Laid-Open No. 2000-59201. It describes a circuit configuration capable of keeping a constant rise and fall time of output data when the drive capacity of an output driver is changed. The semiconductor device is provided with an output terminal outputting data to the outside world, and a plurality of output circuits outputting signals to the output terminal. There are also provided a load adjustment circuit having a capacitance equal to an output circuit capacitance, and an output current adjustment switch circuit selecting between the output circuits and the load adjustment circuit. A drive line driven by a drive line driver is also provided to drive the output circuits using the output current adjustment switch circuit. In this configuration, an output current value is controlled, and the capacitance control allows the control of a rise and fall time of output data.

However, the conventional CMOS push/pull circuit and the circuit described in Japanese Patent Application Laid-Open No. 2000-59201 are difficult to design to attain stable signal transmission in high-speed data transmission such as newly offered by the USB 2.0 standard. At the same time, impedance matching or output level control is highly required for high-speed data transmission. Besides, as explained in the foregoing, the USB 2.0 standard further has the high-speed data transmission mode while retaining the conventional transmission modes. Therefore, the output buffer circuit is required to deal with a plurality of modes supporting widely different transmission speeds. The above conventional output buffer circuit, however, cannot meet the requirement.

SUMMARY OF THE INVENTION

Therefore, an object of the present invention is thus to provide a data transmission circuit and a data transmission method capable of transmitting data in a suitable condition.

Another object of the present invention is to provide a data transmission circuit and a data transmission method capable of supporting a plurality of different transmission modes with different transmission speeds.

Another object of the present invention is to provide a data transmission circuit and a data transmission method capable of transmitting data in a suitable condition in any of the different transmission modes.

Another object of the present invention is to provide efficient construction of a data transmission circuit supporting a plurality of transmission modes.

A data transmission circuit according to the present invention is a data transmission circuit having a first transmission mode and a second transmission mode transmitting data at a lower speed than the first transmission mode, the data transmission circuit outputting output data to a data output line in accordance with input data, including a constant current driver having a constant current source and circuitry connected to the data output line; a buffer circuitry connected to the data output line, having a plurality of switching elements and controlling impedance by the switching elements; a dummy buffer having a plurality of corresponding switching elements, each of the corresponding switching elements corresponding to each of the switching elements of the buffer and having substantially the same capacitance as each of the switching elements of the buffer; and a selection circuit selecting between the switching elements of the buffer and between the corresponding switching elements of the dummy buffer in accordance with an impedance control signal, the selection circuit not selecting corresponding switching elements of the dummy buffer corresponding to selected switching elements of the buffer, while selecting corresponding switching elements of the dummy buffer corresponding to non-selected switching elements of the buffer; wherein, in the first transmission mode, the selected switching elements of the buffer selected by the selection circuit are set to on or off state, and the constant current driver operates in accordance with the input data to output data, and in the second transmission mode, the selected switching elements of the buffer selected by the selection circuit are on/off controlled in accordance with the input data to output data. This configuration allows transmitting data in a suitable condition in any of the plurality of transmission modes.

The data transmission circuit can also include a prebuffer outputting a signal to the buffer in accordance with input data. This configuration allows transmitting data in a more suitable condition.

The data transmission circuit can also include a feedback capacitor adjusting a slew rate of data output. This configuration allows more effective slew rate adjustment.

The data transmission circuit can also include an output load capacitor of the prebuffer to adjust a slew rate of data output. This configuration allows more effective slew rate adjustment.

The data transmission circuit can also include another buffer circuitry connected to the data output line, having a plurality of switching elements and controlling impedance by the switching elements; another dummy buffer having a plurality of corresponding switching elements, each of the corresponding switching elements corresponding to each of the switching elements of the another buffer and having substantially the same capacitance as each of the switching elements of the another buffer; and another selection circuit selecting between the switching elements of the another buffer and between the corresponding switching elements of the another dummy buffer in accordance with an impedance control signal, the another selection circuit not selecting corresponding switching elements of the another dummy buffer corresponding to selected switching elements of the another buffer, while selecting corresponding switching elements of the another dummy buffer corresponding to non-selected switching elements of the another buffer; wherein, the input data and the output data have a first logic condition and a second logic condition, and in the second transmission mode, the selected switching elements of the buffer are on/off controlled in accordance with the input data to output data in the first logic condition, and the selected switching elements of the another buffer are on/off controlled in accordance with the input data to output data in the second logic condition. This configuration allows stable data transmission in accordance with a logic condition.

It is also possible in the above data transmission circuit that the another buffer is isolated from the data output line in the first transmission mode.

Another data transmission circuit according to the present invention is a data transmission circuit having a first transmission mode and a second transmission mode, the data transmission circuit outputting output data to a data output line in accordance with input data, including a constant current driver having a constant current source and circuitry connected to the data output line; and an impedance control circuit circuitry connected to the data output line, having a plurality of switching elements, and controlling impedance by selectively turning on the switching elements, wherein, in the first transmission mode, the output data is output in accordance with an output from the constant current driver operating based on the input data and impedance of the impedance control circuit, and in the second transmission mode, the output data is output by turning on/off selected switching elements of the impedance control circuit in accordance with the input data. This configuration allows transmitting data in a suitable condition in any of the plurality of transmission modes.

It is also possible in the above data transmission circuit that the switching elements of the impedance control circuit are selected in such a way that output impedance of the data transmission circuit is substantially a given value. This configuration allows transmitting data in a more suitable condition.

It is also possible in the data transmission circuit that the switching elements of the impedance control circuit are selected in such a way that an output level of the output data is substantially a given value. This configuration allows transmitting data in a more suitable condition.

The data transmission circuit can also include a resistive element between the constant current driver and the impedance control circuit. This configuration allows determining an output level more effectively.

The data transmission circuit can also include a capacitor adjustment circuit adjusting a capacitor connected to the data output line by selectively connecting a plurality of elements to the data output line, the capacitor adjustment circuit controlled to compensate a capacitance change in the selected switching elements. This configuration contributes to slew rate control.

It is also possible in the above data transmission circuit that the plurality of elements of the capacitor adjustment circuit are corresponding switching elements, each of which corresponding to each of the plurality of switching elements and having substantially the same capacitance as each of the switching elements, and corresponding switching elements corresponding to selected switching elements are isolated from the data output line, while corresponding switching elements corresponding to non-selected switching elements are connected to the data output line. This configuration allows more effective slew rate control.

The data transmission circuit can also include another impedance control circuit connected to the data output line, having a plurality of switching elements, and controlling impedance by selectively setting the switching elements to on state, wherein, in the second transmission mode, a selected one of the impedance control circuit and the another impedance control circuit outputs data to the data output line in accordance with a logic level of the input data. This configuration allows stable data transmission in accordance with a logic condition.

It is also possible in the data transmission circuit that the another impedance control circuit is separated from the data output line in the first transmission mode.

The data transmission circuit can also include a prebuffer outputting a signal to the impedance control circuit in accordance with input data. This configuration allows more stable data transmission.

In the data transmission circuit, a transmission speed of the first transmission mode can be faster than that of the second transmission mode. This configuration facilitates circuit construction.

A data transmission method according to the present invention is a data transmission method having a first transmission mode and a second transmission mode, the data transmission method outputting output data in accordance with input data, including, in the first transmission mode, a step of selectively setting a plurality of switching elements to on state in accordance with an impedance control signal; a step of controlling a constant current driver based on the input data; and a step of outputting output data in accordance with an output of the constant current driver and on-state resistance of the switching elements; and, in the second transmission mode, a step of selecting selected switching elements from the plurality of switching elements in accordance with an impedance control signal; and a step of outputting data by turning on/off the selected switching elements in accordance with the input data. This method allows transmitting data in a suitable condition in any of the plurality of transmission modes.

The data transmission method can also include a step of adjusting a slew rate of data output by selecting switching elements corresponding to non-selected switching elements of the plurality of switching elements and having substantially the same capacitance. This method contributes to slew rate control.

BRIEF DESCRIPTION OF THE DRAWINGS

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

In the following, a preferred embodiment of the present invention will be explained in detail with reference to the drawings.

Figure 1:
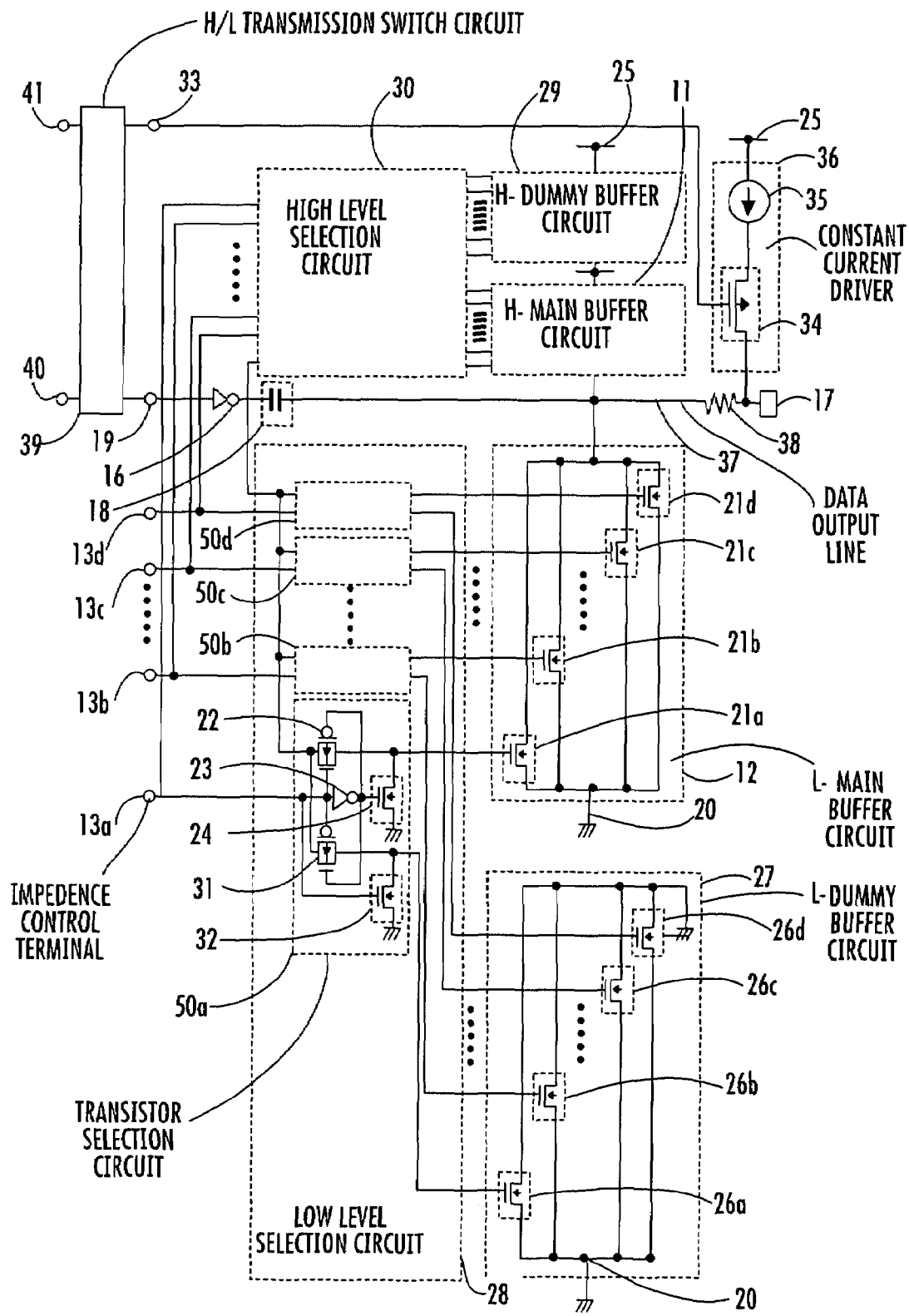
FIG. 1 is a schematic diagram showing a data transmission circuit according to a preferred embodiment of the present invention.

First, the configuration of data transmission circuit according to a preferred embodiment of the present invention will be described hereinbelow with reference to FIG. 1. FIG. 1 schematically shows a configuration example of a data transmission circuit according to the present embodiment, comprising an output buffer circuit employing a CMOS push/pull type constant voltage driver for low-speed transmission, and an output buffer circuit employing a constant current driver for high-speed transmission. The figure shows a substantial part of the data transmission circuit. The data transmission circuit according to the present embodiment is effective when applied to the output buffer of a USB 2.0 controller, for example. The data transmission circuit uses a constant current driver in higher speed data transmission with the transfer rate of 480 Mbps, and uses a constant voltage driver in lower speed data transmission. It is understood that the present invention is not limited to application to USB, and it is applicable to various transmission devices. Pch transistors and Nch transistors in the following description can be replaced each other, and on/off control of the transistors is changed in accordance with a circuit configuration.

As shown in FIG. 1, the data transmission circuit according to the present invention has a main buffer circuit 11 (which will be abbreviated hereinafter as a H-main buffer 11) outputting a high logic level, a dummy buffer circuit 29 (as a H-dummy buffer) for the H-main buffer 11, a main buffer circuit 12 (as a L-main buffer 12) outputting a low logic level, and a dummy buffer circuit 27 (as a L-dummy buffer) for the L-main buffer 12. The circuits are connected to a data output line having an output PAD 17 as an output terminal.

The data transmission circuit according to the present invention also has a high level selection circuit 30 (which will be abbreviated hereinafter as a H-selection circuit 30) switching between the H-main buffer 11 and the H-dummy buffer 29, and a low level selection circuit 28 (as a L-selection circuit 28) switching between the L-main buffer 12 and the L-dummy buffer 27. The selection circuits 28 and 30 have impedance control terminals 13a, 13b, 13c, and 13d selecting drive transistors.

The data transmission circuit further has a prebuffer 16 driving the main buffers 11 and 12, and a feedback capacitor 18 connected between the data output line and the output node of the prebuffer 16. It is also possible for the data transmission circuit not to have the feedback capacitor 18 but to control the slew rate of output data using the main buffer circuits 11 and 12 and the dummy buffer circuits 27 and 29.

The data transmission circuit according to the present invention also has a constant current driver 36, a transmission switch circuit 39 (which will be referred to hereinafter as a H/L transmission switch circuit 39) switching between high-speed data transmission and low-speed data transmission, and a resistive element 38.

In the L-main buffer 12, a plurality of Nch transistors 21a, 21b, 21c, and 21d are connected between the output PAD 17 and a ground line 20.

The size of each of the Nch transistors 21a to 21d is determined considering a control range, control width, and the like to attain optimal output impedance by the combination of control signals input to the impedance control terminals 13a to 13d. The transistors are selected in such a way that output impedance of the data transmission circuit is substantially a given value. For example, different impedance value is assigned to each of the Nch transistors 21a to 21d by weighing for optimal output impedance.

The L-dummy buffer 27 has substantially the same configuration as the L-main buffer 12. A plurality of Nch transistors 26a, 26b, 26c, and 26d are connected between the ground lines 20.

The Nch transistors 26a to 26d can have substantially the same sizes as the Nch transistors 21a to 21d, respectively.

The L-selection circuit 28 includes transistor selection circuits 50a, 50b, 50c, and 50d. Each of the transistor selection circuits 50a to 50d is connected to each of the impedance control terminals 13a to 13d as well as with each of the Nch transistors 21a to 21d of the L-main buffer 12. The transistor selection circuit 50a has a transmission gate 22 and a clamp Nch transistor 24 connected to the L-main buffer 12, a transmission gate 31 for the dummy buffer and a clamp Nch transistor 32 for the dummy buffer connected to the L-dummy buffer 27, and an inverter 23. The other transistor selection circuits have the same configuration.

The transmission gate 22 of the transistor selection circuit 50a is controlled by an impedance control signal input to the impedance control terminal 13a. Via the transmission gate 22, the prebuffer 16 is connected to the gate electrode of the Nch transistor 21a of the L-main buffer 12. The clamp Nch transistor 24 is controlled by a control signal from the inverter 23. The inverter 23 inverts and outputs the impedance control signal from the impedance control terminal 13a. By the Nch transistor 24, the gate electrode of the Nch transistor 21a is clamped to the ground line 20.

Further, in the data transmission circuit according to the present invention, each of the transistor selection circuits 50a to 50d is connected to each of the impedance control terminals 13a to 13d as well as with each of the Nch transistors 26a to 26d of the L-dummy buffer 27.

The transmission gate 31 for the dummy buffer in the transistor selection circuit 50a is controlled by an impedance control signal input to the impedance control terminal 13a. Via the transmission gate 31 for the dummy buffer, the prebuffer 16 is connected to the gate electrode of the Nch transistor 26a of the L-dummy buffer 27. The clamp Nch transistor 32 for the dummy buffer is controlled by a control signal from the impedance control terminal 13a. By the clamp Nch transistor 32 for the dummy buffer, the gate electrode of the Nch transistor 26a is clamped to the ground line 20.

The transmission gate 22 and the transmission gate 31 for the dummy buffer in the transistor selection circuit 50a are alternately turned on or off according to impedance control signals. Each of the input lines of the selection circuits 50a to 50d from the prebuffer 16 is thereby always connected to either the Nch transistor of L-main buffer 12 or the Nch transistor of L-dummy buffer 27. Therefore, the gate electrode capacitance coupled to the output node of the prebuffer 16 remains constant to keep the load capacitance of the prebuffer 16 constant.

The H-selection circuit 30 has substantially the same configuration as the L-selection circuit 30, having transistor selection circuits, each of which connected to each of the impedance control terminals as well as with each of the Pch transistors of the H-main buffer 11.

Further, each of the transistor selection circuits of the H-selection circuit 30 is connected to each of the impedance control terminals as well as with each of the Pch transistors of the H-dummy buffer 29.

The transmission gate for the Pch transistor and the transmission gate for the dummy buffer in the H-selection circuit 30 are alternately turned on or off according to impedance control signals, as with the case with the L-selection circuit 28. Each of the input lines of the selection circuits from the prebuffer 16 is thereby always connected to either the Pch transistor of H-main buffer 11 or the Pch transistor of H-dummy buffer 29. Therefore, the gate electrode capacitance coupled to the output node of the prebuffer 16 remains constant to keep the load capacitance of the prebuffer 16 constant.

The prebuffer 16 is an inverter. The prebuffer 16 inverts an input data signal and outputs the inverted signal to the transmission gate of the L-selection circuit 28 and H-selection circuit 30. The feedback capacitor 18 is provided between the prebuffer 16 and the data output line 37 to prevent a sharp edge of an output signal from the output PAD 17.

As shown in FIG. 1, the constant current driver 36 has a constant current source 35 and a Pch transistor 34. One end of the constant current source 35 is connected to the Pch transistor 34, and the other end is connected to the power line 25. The drain of the Pch transistor 34 is connected to the output PAD 17, and the gate electrode is connected to the H/L transmission switch circuit 39. An data output line 37 is connected to the resistive element 38 and the L-main buffer 12 to control impedance.

The H/L transmission switch circuit 39 has a transmission speed switch terminal 40 for changing the data transmission speed, and a data input terminal 41 to which data is input. The H/L transmission switch circuit 39 further has a high-speed data input terminal 33 to which data is input in high-speed data transmission, and a low-speed data input terminal 19 to which data is input in low-speed data transmission. The high-speed data input terminal 33 is connected to the gate of the Pch transistor 34, and the low-speed data input terminal 19 is connected to the prebuffer 16.

Figure 2:
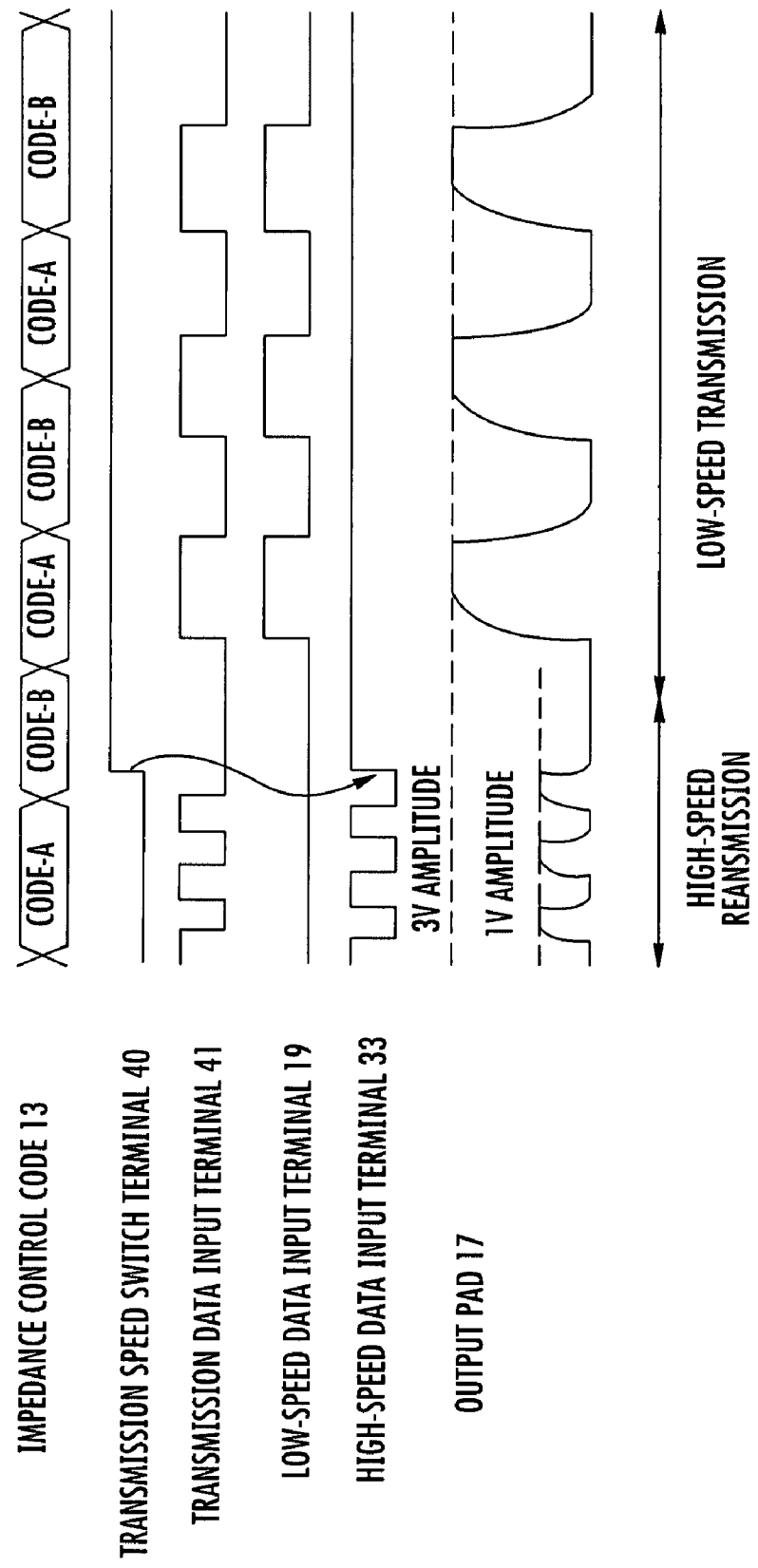
FIG. 2 is a chart showing data transmission according to a preferred embodiment of the present invention.

Next, Operations of the data transmission circuit according to the present embodiment of the invention will be explained hereinbelow with reference to FIGS. 1 and 2. The timing chart in FIG. 2 shows the operations of the data transmission circuit. In the following, operations in high-speed data transmission will be described first, followed by a description of low-speed data transmission.

In data transmission, a control code optimized to attain a desired value of data output impedance is input to the impedance control terminals 13a, 13b, 13c, and 13d. The control code is composed of impedance control signals of a logic high or low input to the impedance control terminals 13a to 13d respectively.

When transmitting data at high speed, a transmission speed control signal to control a speed of transmission is input from the transmission speed switch terminal 40, and a mode is set to high-speed transmission. Data input from the data input terminal 41 is thereby output from the high-speed data input terminal 33 and then transmitted to the Pch transistor 34.

In high-speed data transmission, the transmission speed switch terminal 40 receives a transmission speed control signal to fix the low-speed data input terminal 19 to a logic low. The low-speed data input terminal 19 is thereby always fixed to a logic low. If the low-speed data input terminal 19 is fixed to a logic low, the L-main buffer 12 and the L-dummy buffer 27 are turned on. The L-main buffer 12 thereby serves as a part of terminating resistance.

Fixing the low-speed data input terminal 19 to a logic low, at the same time, turns off the Pch transistors of the H-main buffer 11 and the H-dummy buffer 29. The data output line 37 is thereby disconnected from the power line 25, and therefore no power voltage is applied to the data output line 37.

Since the Pch transistors of the H-main buffer 11 and the H-dummy buffer 29 are off, the terminating resistance value between the output PAD 17 and the ground line 20 is determined by a combination of on-state resistance of the Nch transistors 21a to 21d of the L-main buffer 12, and the resistance element 38. Therefore, the terminating resistance value is optimized by selecting the combination of on-state resistance of the Nch transistors 21a to 21d and the resistance element 38. The output terminal voltage is determined by a constant current value from the constant current source 35 and terminal resistance including impedance of the Nch transistors of the L-main buffer 12 and the resistive element 38. It is thereby possible to prevent output amplitude from differing between products due to production fluctuations of the resistance element 38, thus keeping output potential of the output amplitude constant.

While the Nch transistors 21a to 21a of the L-main buffer 12 serve as terminating resistance, the Nch transistors 26a to 26d of the L-dummy buffer 27 assist in stabilizing the impedance of the terminating resistance. As shown in the later description of low-speed transmission, if the low-speed data input terminal 19 is fixed to a logic low, the Nch transistor of the L-main buffer 12 or that of the L-dummy buffer 27 is selected by a control code input to the impedance control terminals 13a to 13d.

Therefore, if the Nch transistor 21a of the L-main buffer 12 is selected by the control code, for example, the Nch transistor 26a of the L-dummy buffer 26 is not selected. If the Nch transistor 21a is not selected, on the other hand, the Nch transistor 26a is selected. As a result, the terminating resistance between the output PAD 17 and the ground line 20 is stabilized. Also, since the capacitance of the Nch transistors 21a to 21d of the L-main buffer 12 is normally larger than the feedback capacitor 18, stable and accurate control of output impedance is attained in high-speed transmission by optimizing the Nch transistors and adjusting the feedback capacitor 18 to increase impedance accuracy.

The constant current source 35 of the constant current driver 36 supplies a constant current. When transmission data is input to the data input terminal 41, the data is input to the high-speed data input terminal 33, and then input to the gate electrode of the Pch transistor 34. The Pch transistor closes if the transmission data indicates a logic high, and opens if the data indicates a logic low. Therefore, a constant current flows according to on/off of the Pch transistor 34. The constant current together with the impedance of the Nch transistor of the L-main buffer 12 and the resistance element 38 allows high-speed data transmission.

As described above, a stable, constant current from the constant current source 35 enables high-speed data transmission. The Nch transistors 21a to 21d of the L-main buffer 12 serve as a variable part of terminal resistance to keep constant impedance. The transistors are selected in such a way that an output level of output data is substantially a given value. Therefore, an output voltage level of data transmitted at high speed is constant, keeping constant amplitude of the output signal in high-speed data transmission to achieve suitable data transmission.

Though the L-dummy buffer 27 can be eliminated for high-speed data transmission, it is preferably provided in order to ensure stabilization of impedance.

When transmitting data at low speed, on the other hand, a transmission speed control signal controlling the speed of transmission is input from the transmission speed switch terminal 40, and mode is set to low-speed transmission. Data input from the data input terminal 41 is thereby output from the low-speed data input terminal 19 and then transmitted to the prebuffer 16.

In low-speed data transmission, the transmission speed switch terminal 40 receives a transmission speed control signal to fix the high-speed data input terminal 33 to a logic high. The high-speed data input terminal 33 is thereby always fixed to a logic high. If the high-speed data input terminal 33 is fixed to a logic high, a transmission speed control signal is input to the constant current driver 36 as a selection signal to turn off the Pch transistor 34. Therefore, the constant current driver 36 is disconnected from the data output line 37. In this configuration, as explained below, the main buffers 11 and 12 of a constant voltage driver are alternately turned on or off by the low-speed data input terminal 19 to output low-speed transmission data from the output PAD 17 with a power supply potential and a ground potential as signal levels.

For example, if an impedance control signal input to the impedance control terminal 13a is a logic high, the transistor selection circuit 50a opens the transmission gate 22. An output voltage of the prebuffer 16 is thereby released to send an inverted data signal from the prebuffer 16 to the Nch transistor 21a of the L-main buffer 12 to select the transistor 21a as a drive transistor. The transistor is thereby on/off controlled.

When the Nch transistor 21a is selected, the inverted data is input to the gate electrode of the Nch transistor 21a through the transmission gate 22. If the data input to the low-speed data input terminal 19 is at a low level, the Nch transistor 21a opens the gate to clamp the data output line 37 to the ground line 20. A potential of the data output from the output PAD 17 thereby becomes a ground potential of the ground line 20.

If the data is at a high level, on the other hand, while the Nch transistor 21a closes the gate, the Pch transistor of the H-main buffer 11 opens the gate as with the case where the data is at a low level and the Nch transistor of the L-main buffer opens the gate. The data output line 37 is thereby clamped to the power line 25 to set a potential of the data output from the output PAD 17 to a power potential of the power line 25.

If the drive transistor 21a of the L-main buffer 12 is selected by a control code input, the corresponding transistor 26a is not selected in the L-dummy buffer 27. If an impedance control signal of a logic high is input to the impedance control terminal 13a, the transistor selection circuit 50a closes the transmission gate 31 for the dummy buffer 27. An output voltage from the prebuffer 16 is thereby disconnected from the L-dummy buffer 27.

At the same time, the clamp Nch transistor 32 for the dummy buffer in the transistor selection circuit 50a is turned on to fix the gate electrode of the Nch transistor 26a of the L-dummy buffer 27 to the ground potential of the ground line 20. The Nch transistor 26a is then turned off not to be selected as a drive transistor.

If an impedance control signal input to the impedance control terminal 13a is a logic low, on the other hand, the transistor selection circuit 50a closes the transmission gate 22. An output voltage from the prebuffer 16 is thereby disconnected from the Nch transistor 21a. At the same time, the clamp Nch transistor 24 of the transistor selection circuit 50a is turned on to fix the gate electrode of the Nch transistor 21a to the ground potential of the ground line 20. The Nch transistor 21a is thereby turned off and not selected as a drive transistor.

While the transistor 21a of the L-main buffer 12 is not selected by a control code input, the Nch transistor 26a of the L-dummy buffer 27 is selected. When an impedance control signal of a logic low is input to the impedance control terminal 13a, the transistor selection circuit 50a of the L-selection circuit 28 opens the transmission gate 31 for the dummy buffer. An output voltage from the prebuffer 16 is thereby applied to the Nch transistor 26a which is selected as a drive transistor.

As described above, if the Nch transistor of the L-dummy buffer 27 is selected, the capacitance of the prebuffer 16 (an output load capacitance) is the entire capacitance of the Nch transistors 21a to 21d of the L-main buffer 12 plus the feedback capacitor 18. Therefore, the output load capacitance of the prebuffer 16 remains the same when the Nch transistor is selected from the L-main buffer 12 and when it is selected from the L-dummy buffer 27. Stable impedance control as well as slew rate control is thereby achieved to output data from the output PAD 17 in a suitable condition.

The Nch transistors of the L-main buffer 12 and the L-dummy buffer 27 are driven when transmission data is at a low level. The H-main buffer 11 and the H-dummy buffer 29 are not driven when the Nch transistors are driven.

The H-selection circuit 30 operates in the substantially same manner as the L-selection circuit 28. For example, if an impedance control signal input to the impedance control terminal 13a is a logic low, the H-selection circuit 30 selects the Pch transistor not from the H-main buffer 11 but from the H-dummy buffer 29. If the impedance control signal is a logic high, on the other hand, the Pch transistor is selected from the H-main buffer 11, not from the H-dummy buffer 29.

The data transmission device according to the present embodiment operates as described above, and data is output from the output PAD 17 in synchronization with a control code input to the impedance control terminals as shown in FIG. 2. A specific example will be given hereinafter with reference to FIG. 2. A resistance value for optimizing terminating resistance by a combination of on-state resistance of the Nch transistors of the L-main buffer 12 and the resistance element 38 is 50Ω, for example.

A control code of CODE-A or CODE-B is input to the impedance control terminals to compensate a temporal variation in operating temperature or a change in physical property of the transistor, for example. An input code to the impedance control terminal changes from CODE-A to CODE-B, and transistors selected in the L-main buffer 12 or H-main buffer 11 changes accordingly.

In high-speed transmission, a speed switch signal for high-speed transmission is input to the transmission speed switch terminal 40 as shown in FIG. 2; at the same time, data is input to the data input terminal 41. The high-speed data input terminal 33 turns on or off the Pch transistor 34 in synchronization with transmission data input to the data input terminal 41. The output terminal voltage is determined by a constant current value from the constant current source 35 and terminating resistance including impedance of the Nch transistors of the L-main buffer 12 and the resistive element 38. For example, if the constant current source 35 of 20 mA is used and the resistance value for optimizing terminating resistance is 50Ω, the transmission data is output from the output PAD 17 at high speed with a terminal voltage of 1V/0V as signal levels in synchronization with the input transmission data.

In low-speed transmission, a speed switch signal for low-speed transmission is input to the transmission speed switch terminal 40 as shown in FIG. 2; at the same time, data is input to the data input terminal 41. In this case, the Pch transistors of the H-main buffer 11 and the H-dummy buffer 29, and the Nch transistors of the L-main buffer 12 and the L-dummy buffer 27 are alternately turned on or off in accordance with a high or low signal level of the transmission data. The transistors are alternately turned on or off in synchronization with the transmission data input to the data input terminal 41. The transmission data is output from the output PAD 17 at low speed with a power voltage of 3V and a ground voltage of 0V as signal levels.

As described above, the main buffer 11, 12, or the dummy buffer 29, 30 is selected according to the level (high or low) of a control code input to the impedance control terminal, and an output from the prebuffer 17 is input to the transistor of the selected buffer. Since the output load capacitance of the prebuffer 16 is the entire capacitance of the transistors of the main buffers 11 and 12 plus the feedback capacitor 18 as described above, impedance remains stable while adjusting the slew rate. Therefore, a change of the impedance control code does not affect the output load capacitance of the prebuffer 16. Accordingly, as shown in FIG. 2, a continuous output of data having a stable slew rate waveform from the output PAD 17 is achieved when a control code changes from CODE-A to CODE-B, for example.

Figure 3:
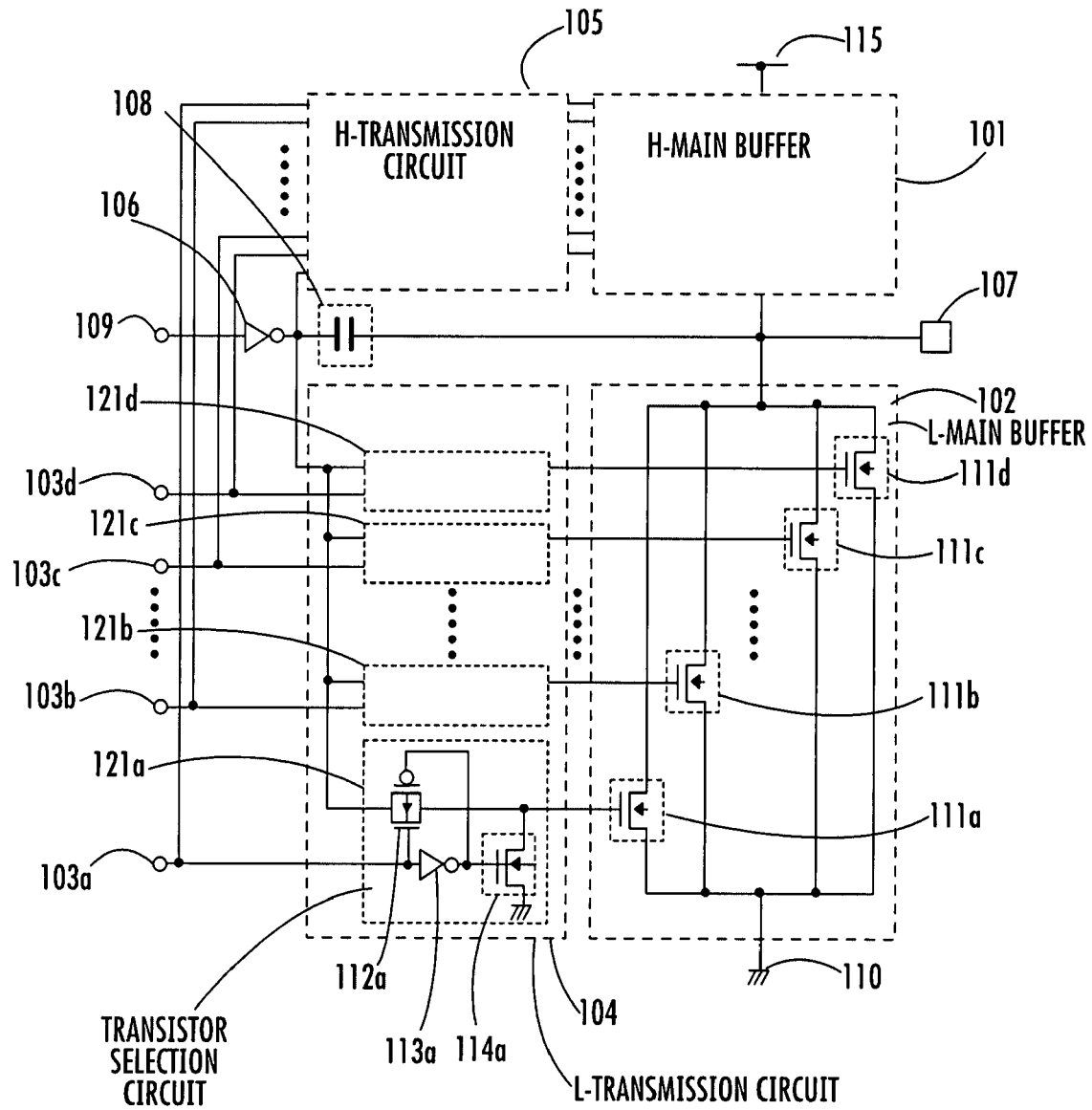
FIG. 3 is a schematic diagram showing a data transmission circuit according to a prior art.
Figure 4:
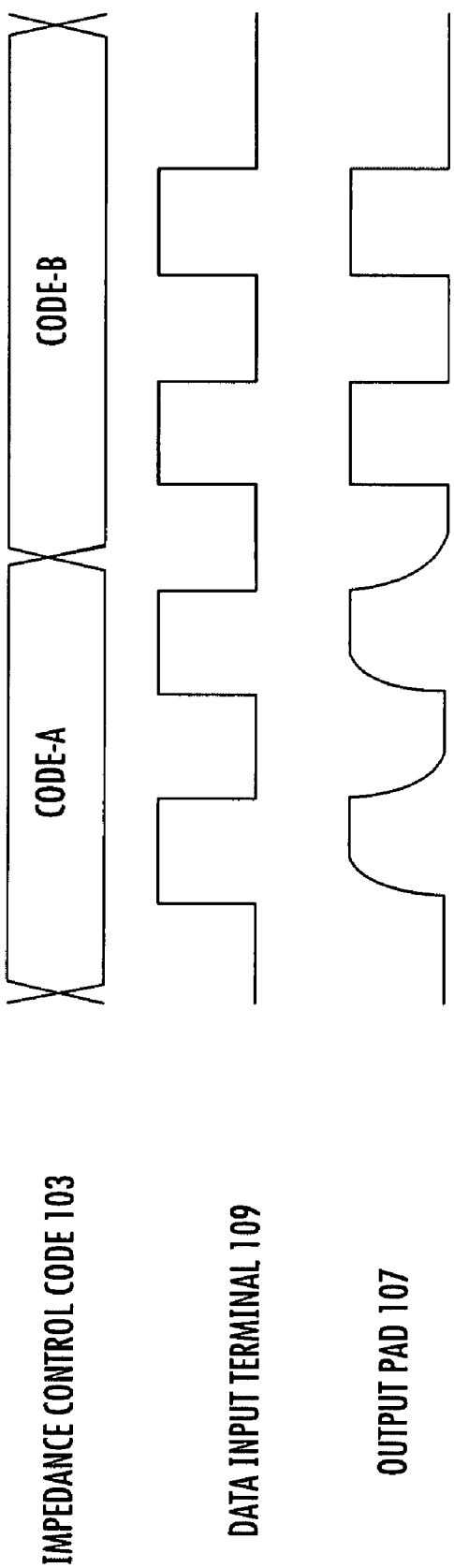
FIG. 4 is a chart showing data transmission according to a prior art.

Providing the selection circuits 28 and 30 requires additional transmission gates for controlling the dummy buffers 27 and 29 (the transmission gate 31 for the L-dummy buffer 27, for example) which are not required in the conventional data transmission circuit shown in FIG. 3. Though the output load capacitance of the prebuffer 16 is thus increased, it causes no problem if the value of the feedback capacitor 18 is optimized in advance considering the increases. The feedback capacitor 18 is easily optimized; therefore, it is easy to achieve the data transmission circuit allowing a continuous output of data having a stable slew rate waveform.

As explained in the foregoing, in the data transmission circuit according to the present embodiment of the invention, the main buffers 11 and 12 control impedance to optimize output impedance when transmitting data at low speed. Further, the dummy buffers 27 and 29 allow suitable control of the slew rate of low-speed transmission data without changing the output load capacitance of the prebuffer 16. Therefore, the data transmission circuit according to the present embodiment is capable of simultaneous control of output impedance and a slew rate. It is thereby possible to optimize a slew rate while optimizing output impedance, thus outputting transmission data to a transmission path in a suitable condition.

In the data transmission circuit according to the present embodiment, the feedback capacitor 18 allows keeping an accurate waveform with an optimized slew rate while optimizing output impedance of an output buffer in accordance with an impedance control code. Further, output impedance of transmission data can be easily controlled since impedance control is conducted by inputting a control code to the impedance control terminals.

The continuous control of output impedance and a slew rate allows suitable data transmission unaffected by a temporal variation in operating temperature or a change in physical property of a transistor. Especially, it is possible to provide a data transmission circuit transmitting data with suitable data amplitude in high-speed data transmission.

Besides, the data transmission circuit according to the present embodiment of the invention allows changing the size of the main buffers 11 and 12, and weighting. Therefore, it is possible to use the feedback capacitor 18 to adjust the output load capacitance of the prebuffer 16 after optimizing the capacitance of the main buffers 11 and 12 which is normally larger than the feedback capacitor 18. Therefore, the output load capacitance of the prebuffer 16 can be adjusted for optimization by the feedback capacitor 18 without increasing the element size. Control accuracy of the slew rate of transmission data is thereby improved to attain a data transmission circuit transmitting data in a suitable condition.

Also, in the data transmission circuit according to the present embodiment, the H/L transmission switch circuit 29 switches between high-speed transmission and low-speed transmission. Therefore, high-speed transmission and low-speed transmission are easily switched by inputting a control signal to the transmission speed switch terminal 40.

Further, in the above data transmission circuit, the main buffer 12 stabilizes impedance in high-speed transmission. The constant current source 35 supplies a constant current to generate output data according to on/off state of the Pch transistor 34. It is therefore feasible in high-speed transmission to output data having stable amplitude in a suitable condition. In addition, the dummy buffers 27 assists in stabilizing impedance in high-speed data transmission.

As described above, the L-main buffer 12 is shared by the output buffer using the constant current driver and the output buffer using the constant voltage driver. Therefore, efficient construction of a transmission circuit capable of switching between the constant current driver and the constant voltage driver in accordance with the transmission speed is attained.

The data transmission circuit according to the present embodiment can have an interactive buffer configuration including an input buffer connected to the output PAD 17. The data transmission circuit can also have a differential buffer configuration including a buffer outputting an opposite logic level to the output PAD 17 connected in parallel.

As explained in the foregoing, the present invention provides a data transmission circuit, semiconductor integrated circuit, and data transmission method transmitting data in a suitable condition.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A data transmission circuit having a first transmission mode and a second transmission mode transmitting data at a lower speed than the first transmission mode, the data transmission circuit outputting output data to a data output line in accordance with input data, comprising:
    a constant current driver having a constant current source and circuitry connected to the data output line;
    a buffer circuitry connected to the data output line, having a plurality of switching elements and controlling impedance by the switching elements;
    a dummy buffer having a plurality of corresponding switching elements, each of the corresponding switching elements corresponding to each of the switching elements of the buffer and having substantially the same capacitance as each of the switching elements of the buffer; and
    a selection circuit selecting between the switching elements of the buffer and between the corresponding switching elements of the dummy buffer in accordance with an impedance control signal, the selection circuit not selecting corresponding switching elements of the dummy buffer corresponding to selected switching elements of the buffer, while selecting corresponding switching elements of the dummy buffer corresponding to non-selected switching elements of the buffer;
    wherein, in the first transmission mode, the selected switching elements of the buffer selected by the selection circuit are set to on or off state, and the constant current driver operates in accordance with the input data to output data, and
    in the second transmission mode, the selected switching elements of the buffer selected by the selection circuit are on/off controlled in accordance with the input data to output data.

2. A data transmission circuit according to claim 1, further comprising a prebuffer outputting a signal to the buffer in accordance with input data.

3. A data transmission circuit according to claim 1, further comprising a feedback capacitor adjusting a slew rate of data output.

4. A data transmission circuit according to claim 2, further comprising an output load capacitor of the prebuffer to adjust a slew rate of data output.

5. A data transmission circuit according to claim 1, further comprising:
    another buffer circuitry connected to the data output line, having a plurality of switching elements and controlling impedance by the switching elements;
    another dummy buffer having a plurality of corresponding switching elements, each of the corresponding switching elements corresponding to each of the switching elements of the another buffer and having substantially the same capacitance as each of the switching elements of the another buffer; and
    another selection circuit selecting between the switching elements of the another buffer and between the corresponding switching elements of the another dummy buffer in accordance with an impedance control signal, the another selection circuit not selecting corresponding switching elements of the another dummy buffer corresponding to selected switching elements of the another buffer, while selecting corresponding switching elements of the another dummy buffer corresponding to non-selected switching elements of the another buffer;
    wherein, the input data and the output data have a first logic condition and a second logic condition, and
    in the second transmission mode, the selected switching elements of the buffer are on/off controlled in accordance with the input data to output data in the first logic condition, and the selected switching elements of the another buffer are on/off controlled in accordance with the input data to output data in the second logic condition.

6. A data transmission circuit according to claim 5, wherein, in the first transmission mode, the another buffer is isolated from the data output line.

7. A data transmission circuit having a first transmission mode and a second transmission mode, the data transmission circuit outputting output data to a data output line in accordance with input data, comprising:

a constant current driver having a constant current source and circuitry connected to the data output line; and an impedance control circuit circuitry connected to the data output line, having a plurality of switching elements, and controlling impedance by selectively turning on the switching elements, wherein, in the first transmission mode, the output data is output in accordance with an output from the constant current driver operating based on the input data and impedance of the impedance control circuit, and in the second transmission mode, the output data is output by turning on/off selected switching elements of the impedance control circuit in accordance with the input data.

8. A data transmission circuit according to claim 7, wherein the switching elements of the impedance control circuit are selected in such a way that output impedance of the data transmission circuit is substantially a given value.

9. A data transmission circuit according to claim 7, wherein, in the first transmission mode, the switching elements of the impedance control circuit are selected in such a way that an output level of the output data is substantially a given value.

10. A data transmission circuit according to claim 7, further comprising a resistive element between the constant current driver and the impedance control circuit.

11. A data transmission circuit according to claim 7, further comprising a capacitor adjustment circuit adjusting a capacitor connected to the data output line by selectively connecting a plurality of elements to the data output line, the capacitor adjustment circuit controlled to compensate a capacitance change in the selected switching elements.

12. A data transmission circuit according to claim 11, wherein the plurality of elements of the capacitor adjustment circuit are corresponding switching elements, each of which corresponding to each of the plurality of switching elements and having substantially the same capacitance as each of the switching elements, and corresponding switching elements corresponding to selected switching elements are isolated from the data output line, while corresponding switching elements corresponding to non-selected switching elements are connected to the data output line.

13. A data transmission circuit according to claim 1, further comprising another impedance control circuit connected to the data output line, having a plurality of switching elements, and controlling impedance by selectively setting the switching elements to on state, wherein, in the second transmission mode, a selected one of the impedance control circuit and the another impedance control circuit outputs data to the data output line in accordance with a logic level of the input data.

14. A data transmission circuit according to claim 13, wherein, in the first transmission mode, the another impedance control circuit is separated form the data output line.

15. A data transmission circuit according to claim 7, further comprising a prebuffer outputting a signal to the impedance control circuit in accordance with input data.

16. A data transmission circuit according to claim 7, wherein a transmission speed of the first transmission mode is faster than that of the second transmission mode.

17. A data transmission circuit having a first transmission mode and a second transmission mode, the data transmission circuit outputting output data to a data output line in response to input data, comprising:

a constant current driver outputting the data in the first transmission mode, said constant current driver having a constant current source and circuitry connected to the data output line to output the data in response to the input data;

a constant voltage driver outputting the data in the second transmission mode, said constant voltage driver having a plurality of switching elements connected to the data output line to output the data in response to the input data;

a selection circuit selectively activate the plurality of switching elements to change an output impedance of the constant voltage driver.

18. A data transmission circuit according to claim 17, wherein said selection circuit turns on at least one of said plurality of switching elements in said first transmission mode, said at least one of said plurality of switching elements operate as an terminating resistance.

19. A data transmission method having a first transmission mode and a second transmission mode, the data transmission method outputting output data in accordance with input data, comprising:

in the first transmission mode, a step of selectively setting a plurality of switching elements to on state in accordance with an impedance control signal;

a step of controlling a constant current driver based on the input data; and a step of outputting output data in accordance with an output of the constant current driver and on-state resistance of the switching elements; and, in the second transmission mode, a step of selecting selected switching elements from the plurality of switching elements in accordance with an impedance control signal; and a step of outputting data by turning on/off the selected switching elements in accordance with the input data.

20. A data transmission method according to claim 19, further comprising a step of adjusting a slew rate of data output by selecting switching elements corresponding to non-selected switching elements of the plurality of switching elements and having substantially the same capacitance.

* * * * *